(12) United States Patent
Inanobe et al.

(10) Patent No.: US 6,212,744 B1
(45) Date of Patent: Apr. 10, 2001

(54) APPARATUS FOR EXPANDING A METAL SHEET

(75) Inventors: Akira Inanobe; Yasuyuki Yoshihara; Akira Iwamura, all of Toyohashi; Fumiaki Seta, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/130,713

(22) Filed: Aug. 7, 1998

(30) Foreign Application Priority Data

Sep. 25, 1997 (JP) .................................................. 9-260484

(51) Int. Cl.[7] .................................................. B21D 31/04
(52) U.S. Cl. .................................................. 29/6.1; 29/2
(58) Field of Search .................................. 29/2, 6.1, 6.2, 29/623.1, 730, 731; 429/242, 243, 244

(56) References Cited

U.S. PATENT DOCUMENTS

| 698,448 | * | 4/1902 | Caldwell . | |
| 4,291,443 | | 9/1981 | Laurie et al. | 29/6.1 |
| 4,299,259 | | 11/1981 | Sugimoto et al. | 141/1.1 |
| 4,621,397 | * | 11/1986 | Schrenk | 29/6.1 |
| 5,088,170 | * | 2/1992 | Spath | 29/6.1 |
| 5,223,354 | | 6/1993 | Senoo et al. | 429/242 |

FOREIGN PATENT DOCUMENTS 0435266   7/1991   (EP) .

* cited by examiner

*Primary Examiner*—Stephen Kalafut
*Assistant Examiner*—Jonathan Crepeau
(74) *Attorney, Agent, or Firm*—Jordan and Hamburg LLP

(57) ABSTRACT

The apparatus comprises a reticulating machine (39) for simultaneously producing in metal sheet (2) of strip form a plurality of slits (67) disposed in a continuous and zigzag arrangement extending in the lengthwise direction thereof, and an expanding machine (40) for expanding in the lateral direction the metal sheet (2) in which slits (67) have been formed in order to produce a lozenge-shaped mesh configuration. The expanding machine (40) comprises two endless conveyor elements (44) disposed at the two lateral edges of the metal sheet (2), chuck members (47), a plurality of which are provided in an equally-spaced arrangement to the endless conveyor elements (44), and a center guide member (91) for conveying the metal sheet (2) while guiding the transverse central portion such that it is deflected to one side in the direction of thickness of the metal sheet (2). The chuck members (47) grip the lateral edges of the metal sheet (2) in which slits (67) have been formed, thereby expanding the metal sheet (2) while conveyed by the endless conveyor elements (44).

9 Claims, 12 Drawing Sheets

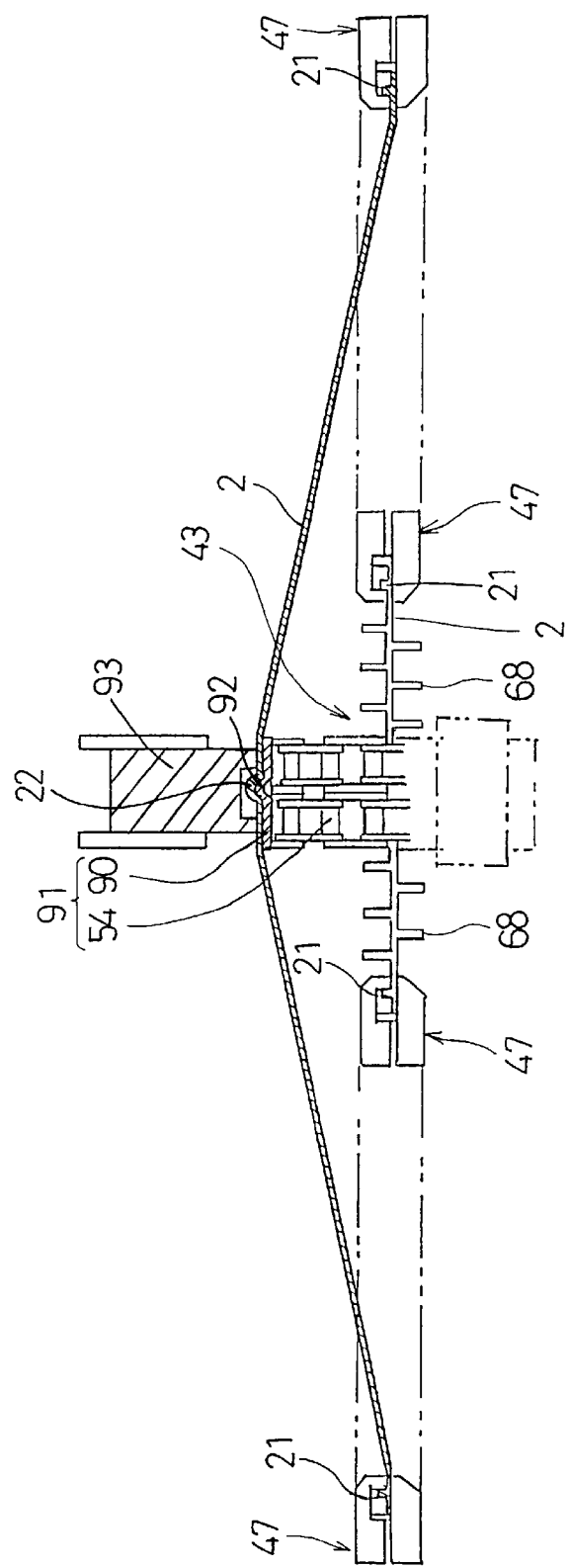

Fig. 14A
Prior Art
Fig. 14B
Prior Art
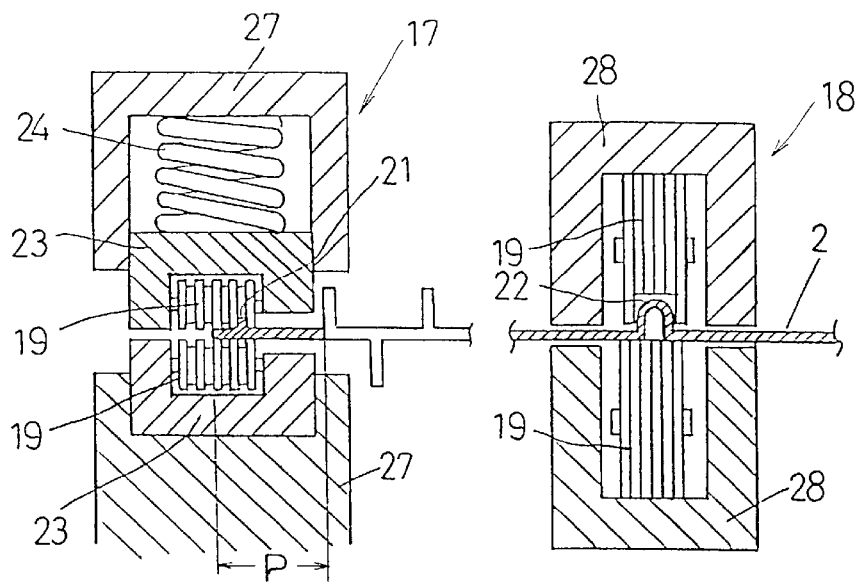
Fig. 15
Prior Art
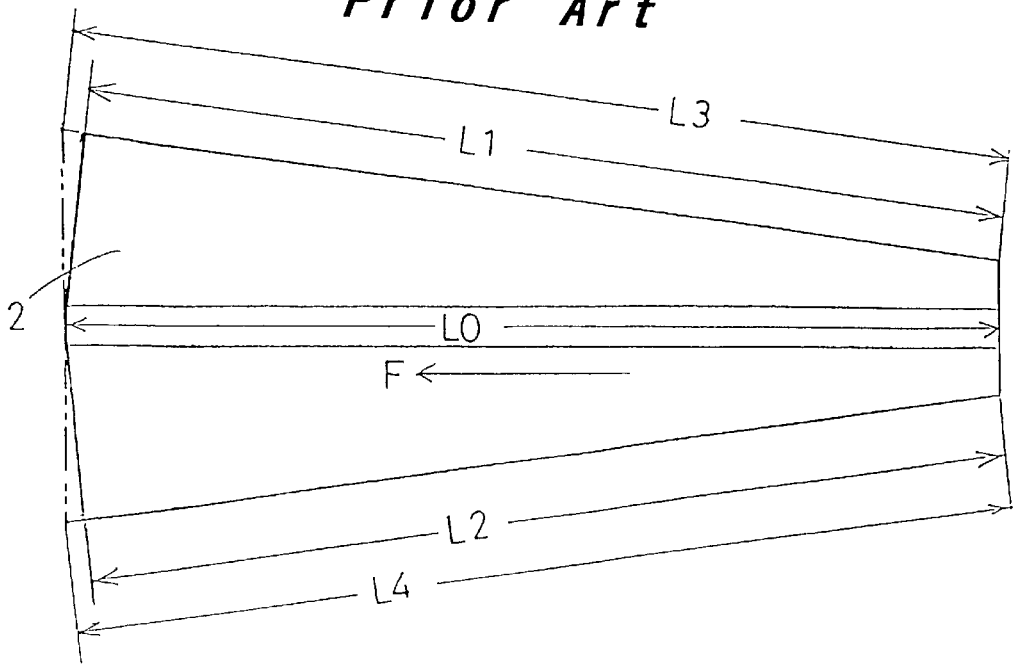

APPARATUS FOR EXPANDING A METAL SHEET

BACKGROUND OF THE INVENTION

1. Technical Field

The present invention relates to a plate for lead storage batteries that is fabricated using a core material of expanded metal having a lozenge-shaped reticulated configuration produced from a slitted metal sheet by expansion thereof in a direction extending perpendicular to the slits, and packing the active material into cells of the expanded sheet, as well as to an apparatus for the manufacture of this plate.

2. Description of Related Art

Plates for lead storage batteries ordinarily consist of an active material packed into a mesh of a reticulated core material. As manufacture through casting offers few potential advantages in terms of improved productivity, such core materials are manufactured using expansion methods in which a lead or other metal sheet is expanded. These methods make continuous manufacture possible. Advantages of expansion methods are the ability to use materials of poor castability and the ability to manufacture thin plates. Expansion methods include the reciprocal process and the rotary process. The reciprocal process involves a serial procedure of intermittently feeding a metal sheet to a cutting die as the cutting die undergoes vertical reciprocating motion in a press in order to form slits, followed by expansion of the mesh. This method, however, is susceptible to changes in the dimensions of the metal sheet which can have an adverse effect on the final dimensions, and accordingly it is not possible to produce a fine mesh with uniform cells. Additional drawbacks are limited production speeds and the need for large-scale equipment. In contrast, in the rotary process the metal sheet is processed by feeding it between a pair of continuously rotated processing rollers provided with disk-shape cutters, thereby affording improvements in productivity.

The manufacture of core materials subjected to expansion by the rotary method using the production apparatus disclosed in Japanese Laid-Open Patent Application 55-61332, Japanese Laid-Open Patent Application 56-7357, and elsewhere is known. The production apparatus has a constitution like that depicted in FIG. 12. A metal sheet 2 in the form of a strip wound onto a coiler 1 is drawn out automatically from the coiler 1 and delivered to a reticulating machine 3. At the entrance to the reticulating machine 3 is provided a free-rotating roller 4 having two (left and right) flanged portions 7 disposed at a prescribed distance which corresponds to the width of the metal sheet 2. These serve to position the entering metal sheet 2 in the lateral direction. Thus, the metal sheet 2 is positioned in the lateral direction and is delivered, properly positioned, to the reticulating machine 3. The metal sheet 2 is passed through a pair of forming rolls 8 provided in the reticulating machine 3 and is thereby provided with peaks and valleys extending in a depthwise direction thereof (see FIG. 5), while at the same time creating a plurality of slits 9 extending in the forward direction.

Once the metal sheet 2 of strip form has been provided with peaks and valleys and with slits 9 by the reticulating machine 3, it is then continuously drawn out in the lateral direction by an expansion machine 10, thereby expanding the slit 9 portions into lozenge-shaped cells 11 to produce a lozenge-shaped reticulated configuration. The lozenge-shaped reticulated metal sheet 2 is then passed through a pair (upper and lower) of press rollers 13 provided to the press machine 12, thereby flattening out any warping, deformation, bending, or burrs produced during the reticulation and expansion processes, producing a continuous expanded metal sheet 14 of strip form. This expanded metal sheet 14 is cut to the prescribed dimensions and shape to produce core materials for lead storage battery plates.

As shown in the schematic perspective view given in FIG. 13, the expansion machine 10 comprises two side drive mechanisms 17 that open out from each other in the forward direction F from locations in proximity to the two lateral edges of the metal sheet 2 exiting the reticulating machine 3 and that convey the metal sheet 2 while pulling its two lateral edges outward, and a center drive mechanism 18 that conveys the metal sheet 2 while guiding the central portion (in the lateral direction) thereof in the forward direction F. Each of the conveyor mechanisms 17 and 18 is provided with a pair of chain members 19 (upper and lower); the metal sheet 2 is conveyed while retained from above and below between the pairs of chain members 19. The chain members 19 are driven around at constant speed in synchronized fashion by a connecting shaft 20.

Using designs such as those depicted in FIG. 14A and FIG. 14B, the side drive mechanisms 17 and the center drive mechanism 18 engage the metal sheet 2 in order to convey it. Specifically, as it passes through the reticulating machine 3, the metal sheet 2 is provided with engagement protrusions 21 disposed at both lateral edges and with an engagement protrusion 22 located in its central portion. The chain members 19 of the conveyor mechanisms 17 and 18 comprise, for example, of triplets of ordinary chains linked together.

In the side drive mechanisms 17, the engagement protrusions 21 are retained between two adjacent (left and right) chain links in the upper chain member 19, with the metal sheet 2 being held from above and below between the pair of chain members 19 so that the metal sheet 2 is gripped at its edges. The upper and lower chain members 19 are held by chain guides 23, with the top chain guide 23 being energized downward by a compression spring 24, forcing the two chain members 19 together so that pressure is applied to pinch the metal sheet 2. The upper and lower chain members 19, conveyed by means of chain guide holders 27 that hold the chain guides 23, advance so as to open out from each other in the forward direction F from locations in proximity to the two lateral edges of the metal sheet 2 as it exits the reticulating machine 3.

In the center drive mechanism 18, the engagement protrusion 22 is retained between two adjacent chain links located in the upper chain member 19, with the upper and lower chain members 19 retaining the metal sheet 2 through chain guides 28 which hold them. The center drive mechanism 18 prevents the central portion of the metal sheet 2 from moving in either direction as it is pulled outward by the two side drive mechanisms 17, conveying the sheet while guiding it in the forward direction F.

However, the production apparatus described above has several drawbacks. As is clearly evident from FIG. 13, the chain members 19 of the side drive mechanisms 17 and the center drive mechanism 18 are all driven at the same travel speed by the connecting shaft 20; however, the side drive mechanisms 17 travel diagonally outward with respect to the forward direction F, with the result that slippage occurs in a central area of the metal sheet 2 as it is conveyed by the center drive mechanism 18. Accordingly, the metal sheet 2 moves in such a way that its two lateral edges are conveyed faster than the central portion lying in the same plane.

Referring to FIG. 15, L0<L3=L4, as indicated by the alternate long and two short dashes lines, so expansion is not uniform between the central portion and the sides, resulting in wrinkles occurring in the central portion. Accordingly, the cells of the expanded sheet are not opened uniformly, resulting in a lozenge-shaped reticulated configuration in which the nodes connecting the cells are misplaced. Areas in which the openings in the metal sheet are larger than necessary are subjected to torsion and become extended, so that when the material is employed as a lead storage cell plate, the cell lattice rapidly experiences discontinuities due to corrosion, as well as falling out of the active material which has been packed into the cells. This results in shortened battery life.

Additionally, the side drive mechanisms 17 are designed to grip the sides of the metal sheet 2 and pull it outwards by means of the chain members 19; however, as gaps are present between the pins and links in the chain members 19, and gaps are also present between the chain guides 23 and the chain members 19, there are limits as to the accuracy of positioning with respect to the chain members 19. Wear is also a problem. Thus, the chain members 19 are not capable of accurately gripping the metal sheet 2 without chattering in order to convey it. This phenomenon also contributes to deviation in opening size when the metal sheet 2 is expanded, making it even more difficult to produce a high-quality core material. As noted in reference to FIG. 15, the chain members 19 of the side drive mechanisms 17 are pulled diagonally away from the forward direction F, and are thus subjected to a high bend load so that breakage of links due to fatigue is a frequent occurrence. It is therefor necessary to replace the chain members 19, which contributes to diminished productivity.

BRIEF SUMMARY OF THE INVENTION

An object of this invention is to solve the problems described above by providing a high-quality plate for lead storage batteries that exhibits minimal deviation in lozenge-shaped cell morphology and arrangement, as well as a manufacturing apparatus capable of producing such a high-quality plate for lead storage batteries.

In order to achieve the objective stated above, the present invention provides a plate for lead storage batteries comprising an expanded reticulated core material produced by slitting in the lengthwise direction a metal sheet consisting of lead or a lead alloy, followed by an expansion process in which the material is expanded in an expansion direction that extends perpendicular to said lengthwise direction, this core material being filled with an active material, wherein said core material has a lozenge-shaped mesh configuration comprising substantially lozenge-shaped cells defined by four linear latticebars and connected by nodes disposed in zigzag fashion, and has a configuration such that the deviation in length of the diagonals of the lozenge-shaped cells in said expansion direction does not exceed 2% with respect to a standard value, and any plurality of nodes disposed along a given line extending in said expansion direction lie within a range of deviation of 1.3 mm or less to either side of a reference line extending in said expansion direction.

This lead storage battery plate comprises a core material with a lozenge-shaped mesh configuration that exhibits virtually no deviation in cell morphology and node arrangement and whose cells include no cells having openings that are larger than necessary, thereby virtually eliminating areas of torsion and extension. Accordingly, the lattice does not experience early onset of discontinuities due to corrosion, and the active material which has been packed into the cells is retained therein for extended periods, thereby affording reliable lead storage battery life.

The apparatus for manufacturing plates for lead storage batteries which pertains to one aspect of the present invention comprises a reticulating machine for conveying in the longitudinal direction a metal sheet of strip form consisting of lead or a lead alloy while producing therein a plurality of slits, disposed in a continuous and zigzag arrangement extending in the lengthwise direction of the metal sheet, by means of at least one pair of processing rollers equipped with disk-shaped cutters, and for simultaneously producing on said metal sheet an engagement protrusion located in the central portion thereof and engagement projections located at the two lateral edges thereof; and an expanding machine for expanding in the lateral direction said slitted sheet to produce a lozenge-shaped mesh configuration; wherein said expanding machine comprises two endless conveyor elements that are disposed opening out from each other in the forward direction from locations in proximity to the two lateral edges of the metal sheet exiting said reticulating machine, and that are driven forward by a drive source; and chuck members, a plurality of which are provided in an equally-spaced arrangement to each of said endless conveyor elements, for serially gripping said engagement protrusions located at the two edges of said slitted metal sheet in order to expand said metal sheet as it is conveyed by said endless conveyor elements, releasing their grip once expansion has been completed.

According to this apparatus for manufacturing plates for lead storage batteries, engagement projections located at the two edges of the metal sheet are gripped by chuck members provided to the endless conveyor elements in order to expand the metal sheet in the lateral direction. Compared to the expansion method of the prior art, in which the metal sheet is expanded while engaged by chain members, the hold on the metal sheet is more reliable, thereby enabling accurate expansion of the metal sheet.

The design of the chuck members of the invention disclosed herein may comprise a frame element secured to the endless conveyor element, a stationary chucking element disposed at the edge of the frame element, a moveable chucking element linked in pivotal fashion with respect to this stationary chucking element for grasping the metal sheet between itself and the stationary chucking element, and a cam follower, provided to this moveable chucking element, for engaging a cam extending along the track of said chuck member in order to operate said moveable chucking element, pivoting it with respect to the stationary chucking element.

With this design, it is necessary to use hard, high-strength metal only for the stationary chucking elements and the moveable chucking elements, which directly grip the metal sheet, thereby providing reliable gripping of the metal sheet by means of an inexpensive design, ensuring reliable equipment life, and avoiding diminished productivity due to the need for frequent replacement of components due to breakage and the like.

In preferred practice, the stationary chucking element of the chuck member of this invention is provided with a positioning protrusion for contacting the lateral edge of the metal sheet, while the moveable chucking element is provided with an engagement recession for receiving and holding the engagement projections that are provided to said metal sheet in proximity to the lateral edges thereof.

With this design, the depth of bite of the chuck members located at the edges of the metal sheet is accurately maintained by the positioning protrusions, and the chuck members grip the metal sheet with the engagement projections thereof disposed in firm contact with the inside face of the engagement recession of the moveable chucking element. Accordingly, the edges of the metal sheet can be gripped by the chuck members without chatter, and the grip margin of the metal sheet by the chuck members can be reduced to the maximum extent possible, thereby reducing the area which must be cut off after completing the expansion process, reducing material loss.

In the invention described herein, there is provided along the chuck member track an opening-prevention guide plate for engaging the chuck member cam follower at a location opposite the location thereof engaging the cam, thereby preventing the moveable chucking element from moving in the release direction away from the stationary chucking element, the location of the opening-prevention guide plate determining the gripped force exerted on the metal plate by the two chucking elements.

With this design, the stationary chucking element is prevented from moving towards the open direction, and the edge of the metal sheet is securely gripped by the two chucking elements, preventing it from coming out. By selecting the thickness of the opening-prevention guide plate with reference to the thickness of the metal sheet, the appropriate level of gripping force of the metal sheet by the two chucking elements can be achieved, thereby avoiding damage to the metal sheet due to excessive gripping force and preventing the occurrence of wrinkles during expansion.

The apparatus for manufacturing plates for lead storage batteries which pertains to a further aspect of the present invention comprises a reticulating machine for conveying in the longitudinal direction a metal sheet of strip form consisting of lead or a lead alloy while producing therein a plurality of slits, disposed in a continuous and zigzag arrangement extending in the lengthwise direction of the metal sheet, by means of at least one pair of processing rollers equipped with disk-shaped cutters, and for simultaneously producing on said metal sheet an engagement protrusion located in the central portion thereof and engagement projections located at the two lateral edges thereof; and an expanding machine for pulling respectively outward the two lateral edges of the slitted metal sheet while conveying it in said forward direction to effect expansion thereof, producing a lozenge-shaped mesh configuration in said metal sheet; wherein said expanding machine comprises a center guide member for conveying said metal sheet while gradually guiding the transverse central portion thereof along a straight-line path that is deflected to one side in the direction of thickness of said metal sheet.

According to this apparatus for manufacturing plates for lead storage batteries, as the two edges of the metal sheet are conveyed while being pulled outwards respectively within the same horizontal plane, the central portion of the metal sheet is conveyed while being deflected either upward or downward. By establishing the angle of deflection by the upward slope or downward slope of the central guide element such that the distance over which the metal sheet is conveyed in the forward direction per unit of time is substantially equal to the distance over which the sides of the metal sheet are conveyed outward, it becomes possible to convey the sheet by the same distance over the entire lateral extension thereof so that the metal sheet becomes uniformly expanded over the entire lateral extension thereof.

Accordingly, the metal sheet does not experience wrinkling in the central portion thereof, allowing it to be expanded in a lozenge-shaped reticulated configuration having cells with uniform openings. Furthermore, since the metal sheet is conveyed at the same speed over the entire lateral extension thereof, the chuck members are subjected only to pulling force in the lateral direction, ensuring longer life.

In accordance with the inventions disclosed above, the expansion machine comprises side drive mechanisms for conveying the metal sheet while pulling the lateral edges thereof respectively outward, and a center drive mechanism for conveying the transverse central portion of the metal sheet while guiding it in the forward direction, said center drive mechanism and said side drive mechanisms being driven forward by separate drive sources, and the center drive mechanism being conveyed at a faster rate of speed than the side drive mechanisms.

With this design, the speed at which the center drive mechanism is driven by the drive source can be set appropriately so as to permit adjustment or fine-tuning such that the distance over which the metal sheet is conveyed in the forward direction per unit of time is substantially equal to the distance over which the sides of the metal sheet are conveyed outward, thereby affording a core material of higher quality.

The apparatus for manufacturing plates for lead storage batteries which pertains to a still further aspect of the present invention comprises a reticulating machine for conveying in the longitudinal direction a metal sheet of strip form consisting of lead or a lead alloy while producing therein a plurality of slits, disposed in a continuous and zigzag arrangement extending in the lengthwise direction of the metal sheet, by means of at least one pair of processing rollers equipped with disk-shaped cutters, and for simultaneously producing on said metal sheet an engagement protrusion located in the central portion thereof and engagement projections located at the two lateral edges thereof; and an expanding machine for expanding in the lateral direction said slitted sheet to produce a lozenge-shaped mesh configuration; wherein said expanding machine comprises two endless conveyor elements that are disposed opening out from each other in the forward direction from locations in proximity to the two lateral edges of the metal sheet exiting said reticulating machine, and that are driven forward by a drive source; chuck members, a plurality of which are provided in an equally-spaced arrangement to each of said endless conveyor elements, for serially gripping said engagement projections located at the two edges of said slitted metal sheet in order to expand said metal sheet as it is conveyed by said endless conveyor elements, releasing their grip once expansion has been completed; and a center guide member for conveying said metal sheet while gradually guiding the transverse central portion thereof along a straight-line path that is deflected to one side in the direction of thickness of said metal sheet.

According to this apparatus for manufacturing plates for lead storage batteries, the engagement projections located at the two edges of the metal sheet are gripped by the chuck members, ensuring reliable hold of the metal sheet, while the presence of the center guide member allows the metal sheet to be conveyed at the same speed in the forward direction over the entire lateral extension thereof so that the metal sheet is expanded uniformly over the entire lateral extension thereof, thereby affording a core material for lead storage battery plates of extremely high quality that exhibits uniform cell openings and that is free from misplaced nodes. Since the metal sheet is conveyed at the same speed in the forward direction over the entire lateral extension thereof, the chuck members are subjected only to pulling force in the lateral direction, ensuring longer life.

The manufacturing apparatus is not limited to the manufacture of core materials for lead storage battery plates, and may be employed in the manufacture of other expanded mesh sheets, such as lath mesh.

These and other objects, features and advantages of the invention will become more apparent upon a reading of the following detailed description and drawing below.

BRIEF DESCRIPTION OF THE DRAWINGS

FIG. 8 is a lateral section depicting central and side drive mechanisms in the expanding machine of the apparatus;

FIG. 14A and 14B show the metal sheet gripped by the expanding machine, 14A being a lateral section of a side drive mechanism and 14B being a lateral section of the center drive mechanism; and FIG. 15 is an illustrative diagram depicting expansion of a metal sheet by the expanding machine.

DETAILED DESCRIPTION OF PREFERRED EMBODIMENTS

Preferred embodiments of the present invention are now described referring to the accompanying drawings.

Figure 10:
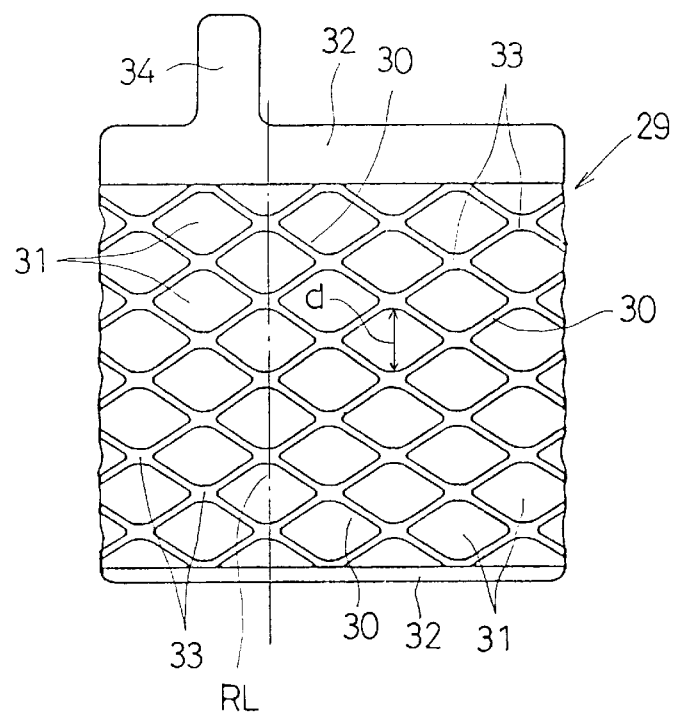
FIG. 10 is a plan view of a core material for a lead storage battery plate of the present invention, produced by said apparatus.

FIG. 10 is a plan view of a core material 29 for use in a lead storage battery plate pertaining to one embodiment of the present invention. This core material 29 has a lozenge-shaped mesh configuration comprising substantially lozenge-shaped cells 31 defined by four linear latticebars 30 and connected by nodes 33 disposed in zigzag fashion between frame bars 32 located to either side. One of the frame bars 32 (the top one in the drawing) is provided with a collector element 34 integrally formed therewith. The core material 29 morphology is such that a deviation in length, d, of diagonals of the lozenge-shaped cells 31 in an expansion direction (the vertical direction in the drawing) does not exceed 2% with respect to a standard value, and any plurality of nodes 33 lying along a given line extending in the expansion direction lie within a range of deviation of 1.3 mm or less to either side of a reference line, RL, extending in the expansion direction.

Figure 11:
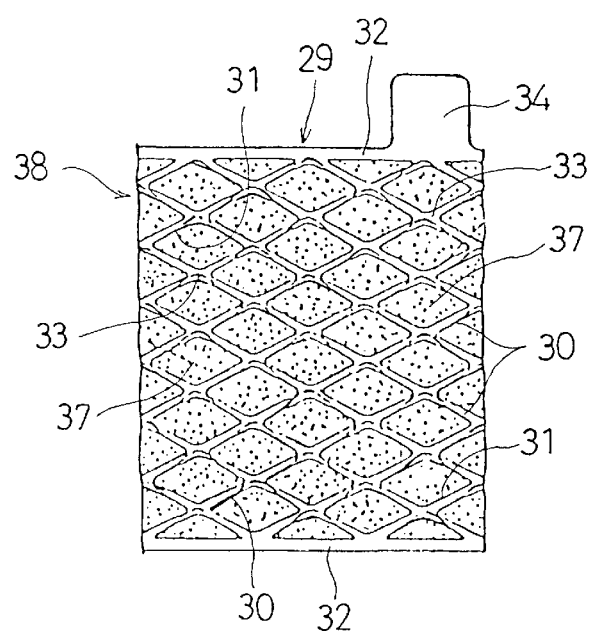
FIG. 11 is a plan view of a lead storage battery plate pertaining to an embodiment of the present invention, constructed using said core material.

FIG. 11 shows a lead storage battery plate 38 produced by packing an active material 37 into the cells 31 of said core material 29. This plate 38 is produced from said core material 29, which is virtually free from deviations in cell 31 morphology and node 33 placement. Since the cell 31 openings are substantially uniform, none of the openings are larger than necessary, that is, there are essentially no areas having been subjected to torsion and become extended; thus, the lattice 30 does not experience early onset of discontinuities due to corrosion, and the active material 37 which has been packed into the cells 31 is retained therein for extended periods, thereby affording reliable lead storage battery life.

Figure 1:
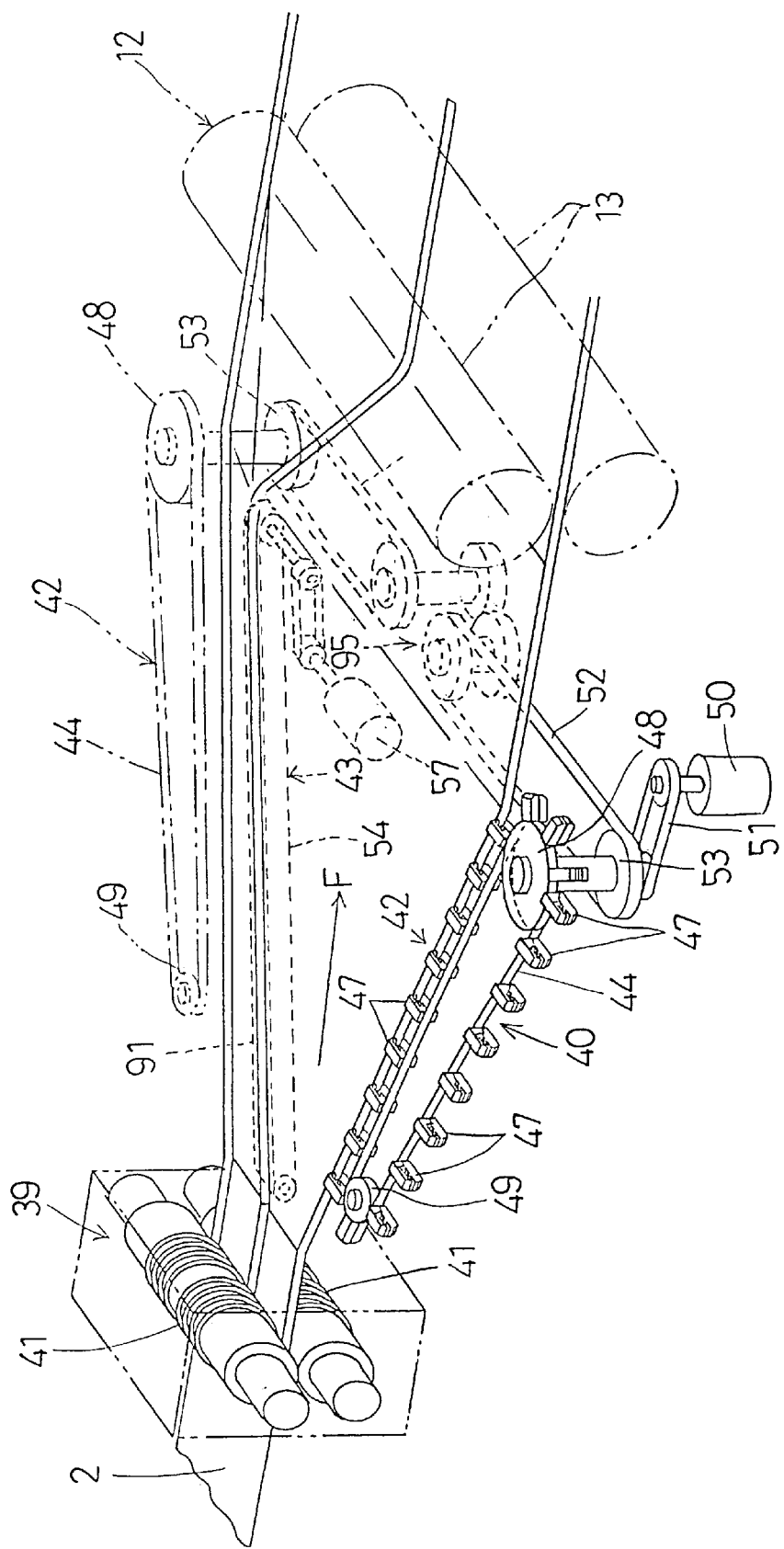
FIG. 1 is a schematic perspective view showing principal elements of a lead storage battery plate manufacturing reticulating apparatus pertaining to an embodiment of the present invention.
Figure 12:
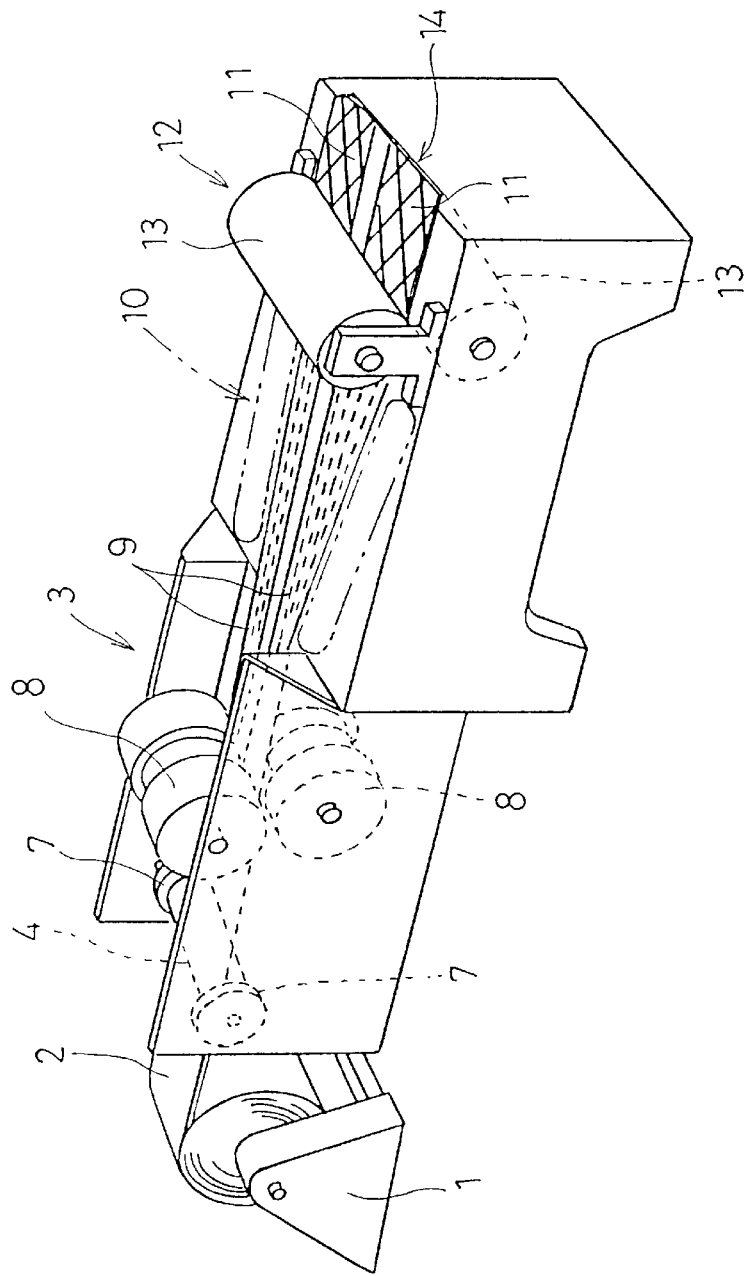
FIG. 12 is a perspective view of a conventional manufacturing apparatus for lead storage battery plates.
Figure 13:
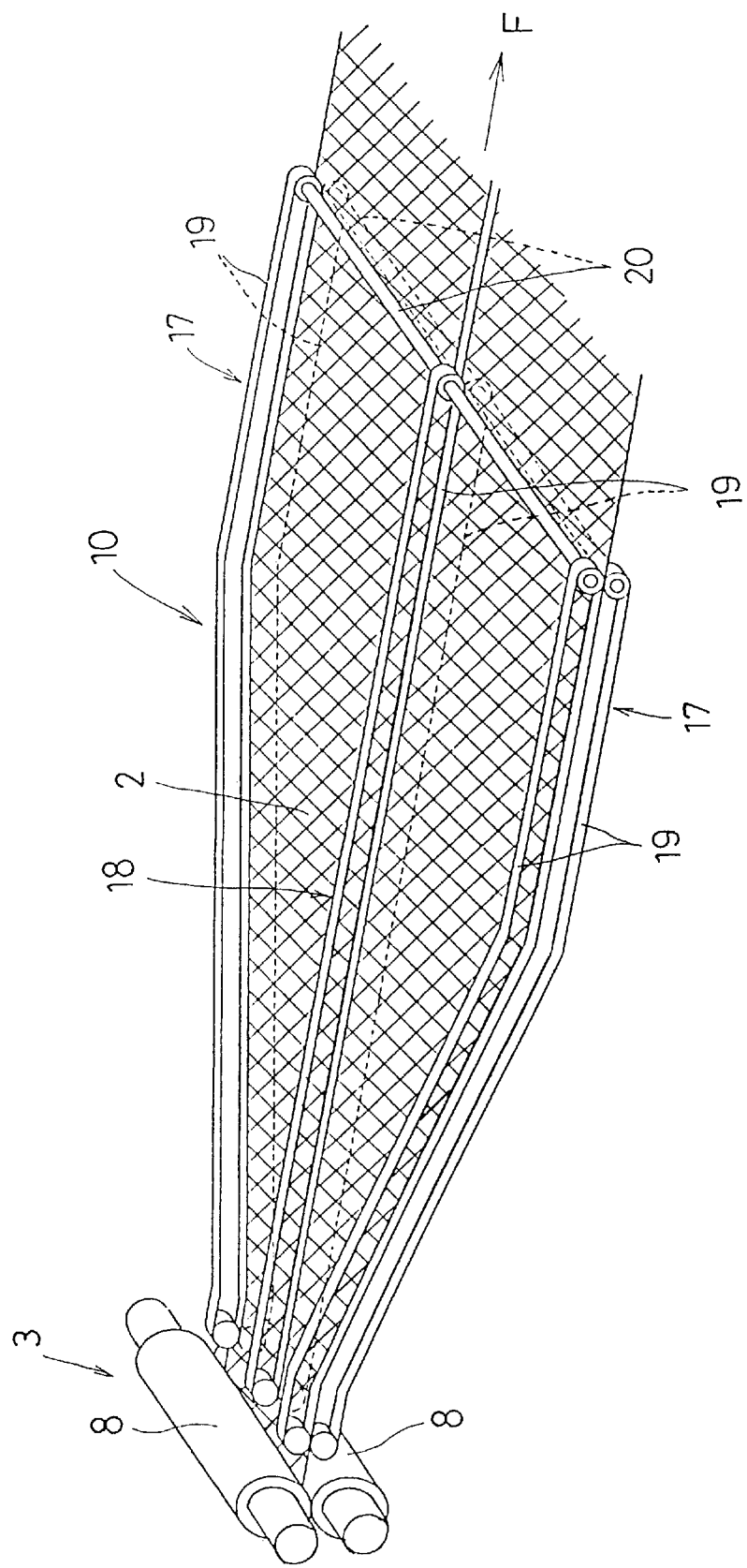
FIG. 13 is a schematic perspective view of an expanding machine in the apparatus.

FIG. 1 is a schematic perspective view showing principal elements of a lead storage battery plate manufacturing apparatus pertaining to an embodiment of the present invention that can be used to manufacture said core material 29 for the lead storage battery plate 38. Referring to the drawing, this manufacturing apparatus comprises a coiler and free-rotating roller similar to those discussed with reference to FIG. 12, a reticulating machine 39 comprising a pair of processing rollers 41, an expanding machine 40, and a press machine 12 comprising a pair of press rollers 13. The reticulating machine 39 is capable of conveying in the longitudinal direction a metal sheet 2 of strip form consisting of lead or a lead alloy while producing therein a plurality of slits, disposed in a continuous and zigzag arrangement extending in the lengthwise direction of the metal sheet 2, by means of a pair of processing rollers 41, and will be described in detail later.

The expanding machine 40 is used for expanding the slitted metal sheet 2 in the lateral direction to produce a lozenge-shaped reticulated configuration, and comprises two side drive mechanisms 42 for pulling respectively outward the lateral edges of the metal sheet 2 and a center drive mechanism 43 for conveying the metal sheet 2 while guiding the central portion (in the lateral direction) thereof in the forward direction F. The side drive mechanisms 42 comprise forward-driven endless conveyor elements 44 disposed opening out from each other in the forward direction F from locations in proximity to the two lateral edges of the metal sheet 2 exiting the reticulating machine 39, and chuck members 47, a plurality of which are provided in an equally-spaced arrangement on each of the endless conveyor elements 44. The chuck members 47 serially grip engagement protrusions (described later) that are located at the two lateral edges of the metal sheet 2 in order to expand the metal sheet 2 as it is conveyed by the endless conveyor elements 44, releasing their grip once expansion has been completed. The chuck members 47 will be discussed in greater detail later.

The endless conveyor elements 44 of the side drive mechanisms 42 are suspended on drive wheels 48 and driven wheels 49, the rotation of a motor 50 which serves as the single drive source being transmitted thereto through belts 51 and 52, a reverse conversion mechanism 95, and a passive wheel 53 in such a way that the elements are driven in synchronized fashion. The center drive mechanism 43 is provided with a conveyor chain 54, disposed below the metal sheet 2, that is deflected upward in the forward direction F so as to incline upward in opposition to the central portion of the metal sheet 2, the conveyor chain 54 being driven through transmission of the rotational motion of a motor 57 which serves as the drive source. The rotational speeds of the two motors 50 and 57 are set so that the center drive mechanism 43 is driven forward faster than are the side drive mechanisms 42. The center drive mechanism 43 will be described in greater detail later on.

Figure 2:
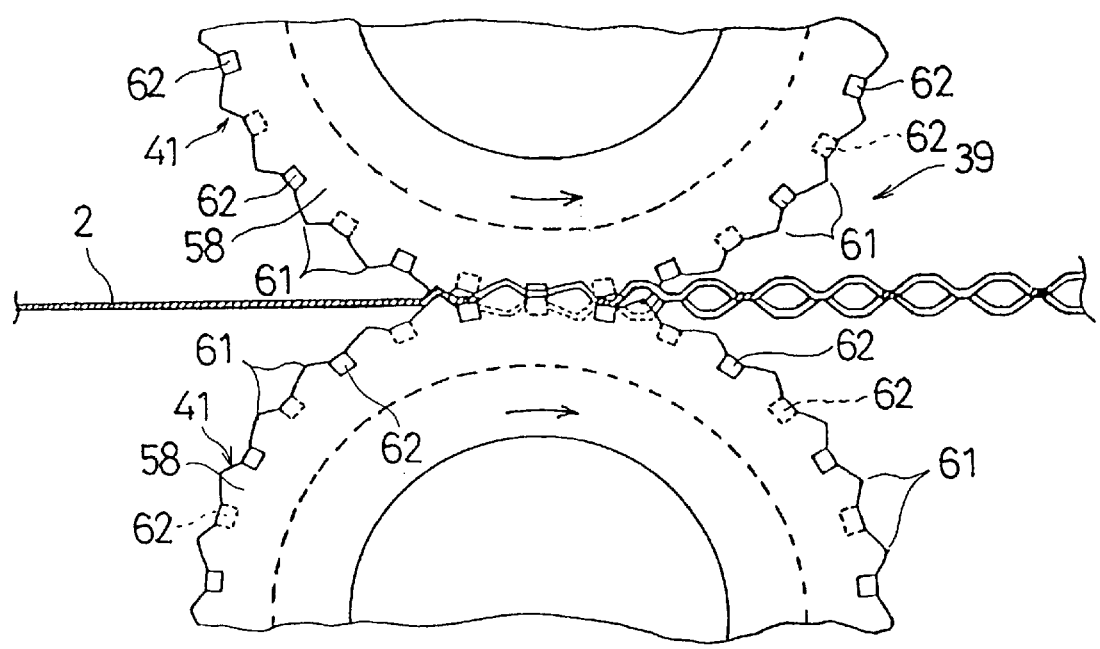
FIG. 2 is a partly enlarged side view of a pair of processing rollers in the apparatus.
Figure 3:
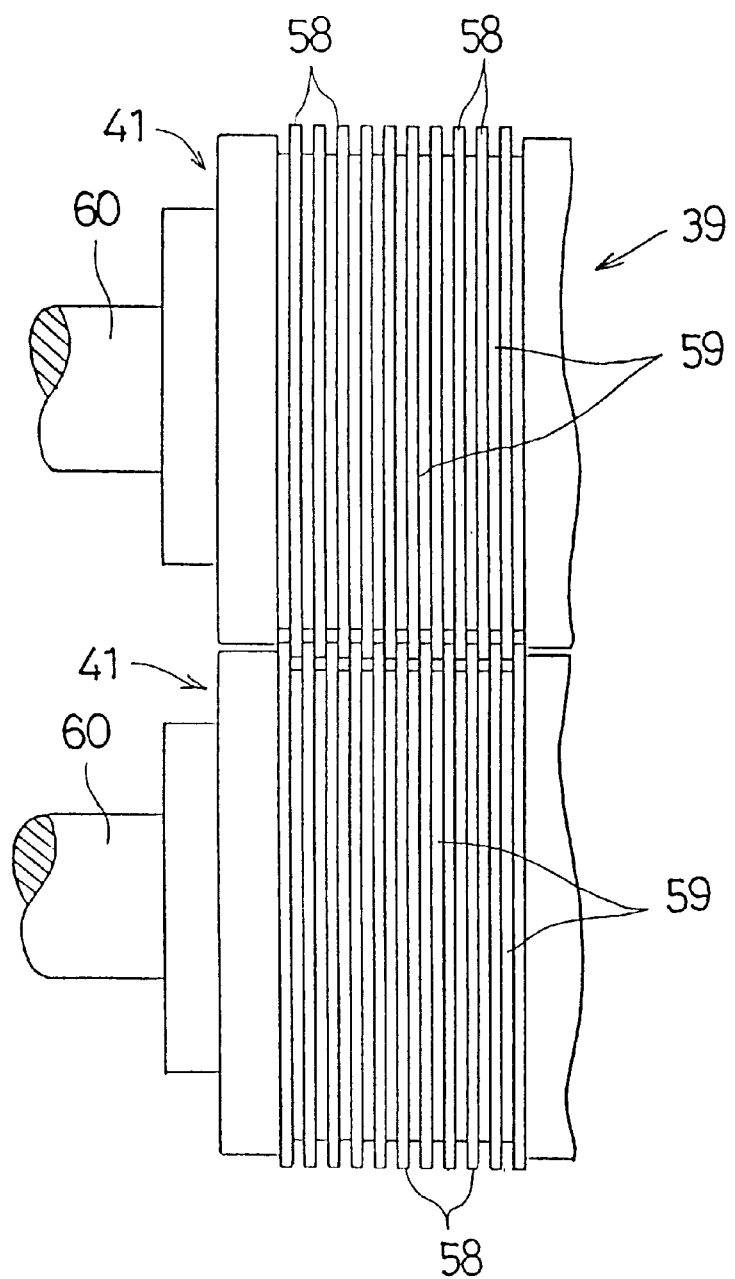
FIG. 3 is a partly enlarged front view of the pair of processing rollers in the reticulating machine.

First, the reticulating machine 39 will be discussed in greater detail. A partially enlarged side view of the reticulating machine 39 is given in FIG. 2; a partially enlarged front view of the reticulating machine 39 is given in FIG. 3. Referring to FIG. 3, the pair of upper and lower processing rolls 41 that make up the reticulating machine 39 comprise disk-shaped cutters 58 and disk-shaped spacers 59 of smaller diameter, disposed in alternating fashion affixed to a rotating shaft 60. Accordingly, the disk-shaped cutters 58 are disposed at regular intervals corresponding to the thickness of the spacers 59. Referring to FIG. 2, the disk-shaped cutters 58 are provided with crest-like projections 61 for producing the linear latticebars 30 and recesses 62 for producing the nodes 33, these elements being disposed around the rim at a prescribed pitch.

The following design is well-known and is thus not depicted in the drawings. Said recesses 62 take the form of recessed grooves provided to one side of each of the flat segments located between adjacent projections 61, these recesses 62 being produced alternately on the left side and the right side of the rim in the circumferential direction; the two edges of each projection 61 and the edges on those sides of the flat segments not having recesses 62 are provided with blade segments (not shown) for the purpose of shearing the metal sheet 2. Turning now to the processing rolls 41, the disk-shaped cutters 58 are disposed with the projections 61 located on lines running parallel to the rotating shaft 60, with the recesses 62 of adjacent disk-shaped cutters 58 disposed in opposition. The two processing rolls 41 are disposed in opposition in such a way that when recesses 62 are positioned on a line connecting the two centers of rotation, the blade segments of the disk-shaped cutters 58 on one of the processing rolls 41 mesh with the blade segments of the disk-shaped cutters 58 on the other processing roll 41 so that the metal sheet 2 is sheared between the two. As the two processing rolls 41 rotate in synchronized fashion in the direction indicated by the arrows in FIG. 2, the interlocking force thereof simultaneously produces in the metal sheet 2 serial slits and peaks/valleys disposed at equal pitches as the metal sheet 2 is conveyed along.

Figure 4A:
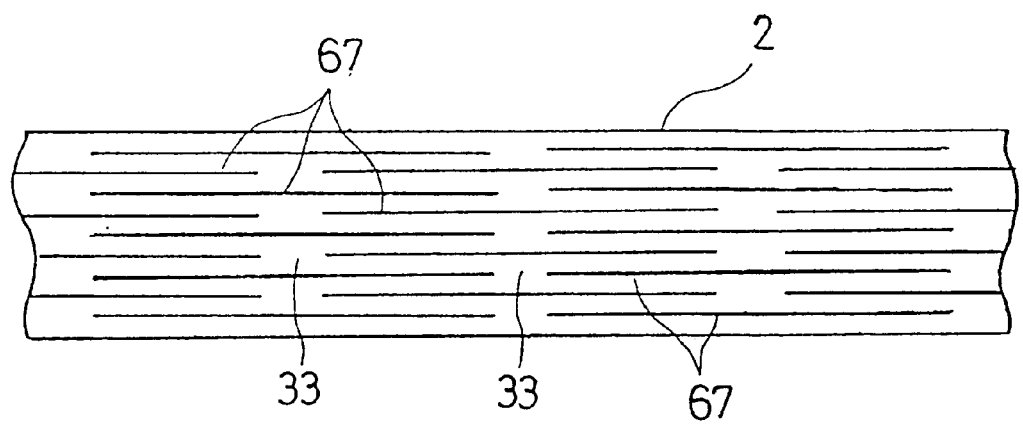
FIG. 4A is a plan view and FIG. 4B is a longitudinal section, respectively depicting portions of a metal sheet processed by the reticulating machine.
Figure 4B:
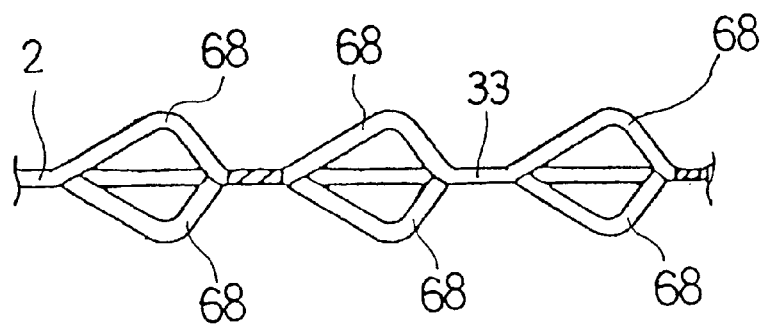
Figure 5:
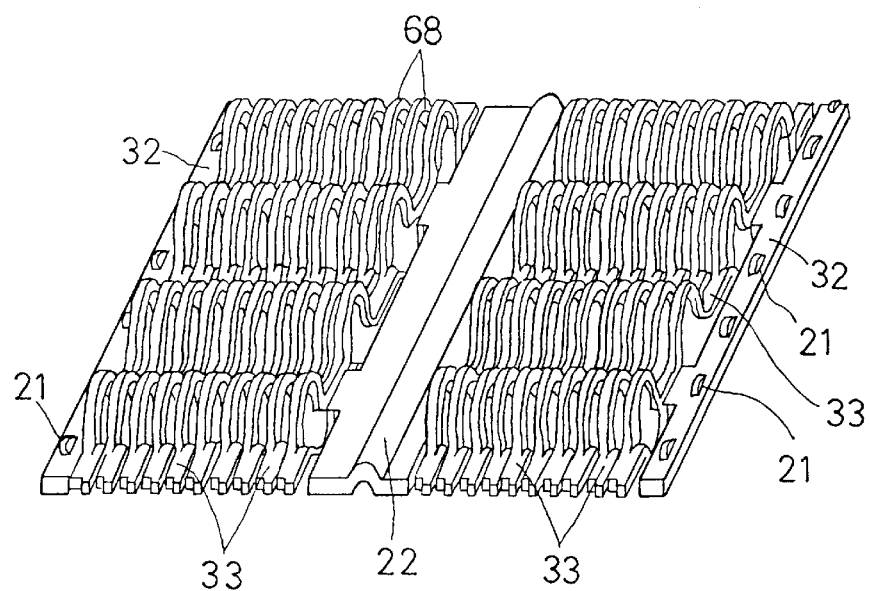
FIG. 5 is a perspective view of the metal sheet.
Figure 6:
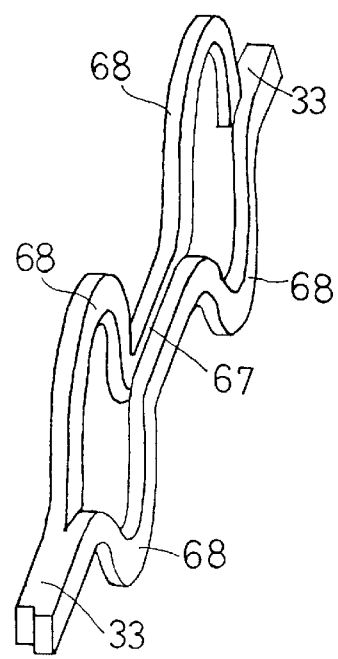
FIG. 6 is a partly enlarged section of FIG. 6.

A metal sheet 2 having been processed by the reticulating machine 39 is depicted in FIGS. 4 through 6. FIG. 4A is a plan view, FIG. 4B is a longitudinal section thereof, FIG. 5 is a perspective view, and FIG. 6 is a partly enlarged perspective view of FIG. 5. Employing a reticulating machine 39 having the constitution described above, the metal sheet 2, which is fed between the two processing rolls 41, is sheared by the blade segments of the opposing disk-shaped cutters 58, producing the slits 67 depicted in FIG. 4A, these slits 67 being rendered discontinuous at locations corresponding to the pitch of placement of the recesses 62 where disposed between two opposing recesses 62, thereby producing nodes 33 that are located between slits 67 in the forward direction F. The projections 61, located on the disk-shaped cutters 58, project to push upward or downward at locations on the metal sheet 2 at which slits 67 have been formed, thereby pushing out areas of curved distention 68. When these areas of curved distention 68 are expanded in a subsequent process by the expanding machine 40, latticebars 30 are produced. Referring to FIG. 5, engagement projections 21 are formed at locations in proximity to the lateral edges, while at the same time producing an engagement protrusion 22 in the central portion.

Figure 7:
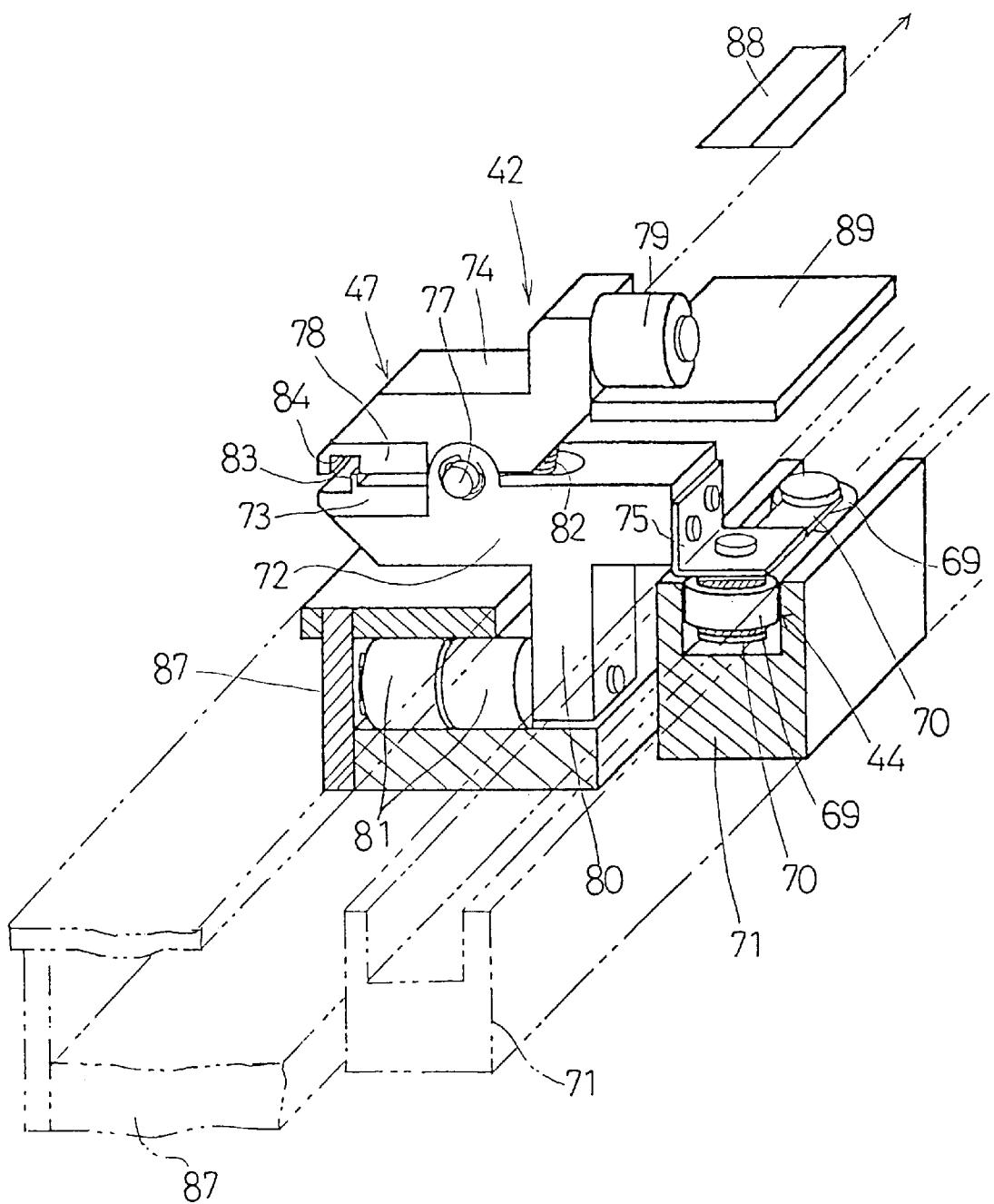
FIG. 7 is a perspective view of a side drive mechanism in the expanding machine of the apparatus with principle elements shown in broken view.

Next, the expanding machine 40 will described. FIG. 7 is a perspective view of a side drive mechanism 42 of the expanding machine 40 with principle elements shown in broken view. The endless conveyor element 44 comprises rollers 69 linked by links 70 in a linked chain configuration which moves guided by a chain guide 71. Each of the plurality of chuck members 47 mounted on the endless conveyor element 44 comprises a frame element 72 affixed to the endless conveyor element 44 by means of a mounting piece 75 having an "L" shape, a stationary chucking element 73 provided on an edge of the frame element 72, a moveable element 74 pivotably linked to the frame element 72 by means of a pivot 77, a movable chucking element 78 provided on an edge of the moveable element 74 for gripping the metal sheet between itself and the stationary chucking element 73, a cam follower 79, consisting of a roller, which is provided on the moveable element 74, and two guide rollers 81 that are pivotably mounted to a lower projecting element 80 of the frame element 72. The two chucking elements 73 and 78 are both fabricated of a hard, strong metal and are secured to the frame element 72 and the moveable element 74 with screws (not shown).

Between the frame element 72 and the moveable element 74 is interposed a compression spring 82 which fits into recesses provided in the elements. Through the agency of the moveable element 74, the compression spring 82 biases the moveable chucking element 78 in the closed direction such that it contacts the stationary chucking element 73. The stationary chucking element 73 is provided with a positioning protrusion 83 abuts the lateral edge of the metal sheet 2, while the moveable chucking element 78 is provided with an engagement recess 84 capable of accommodating and retaining the engagement protrusion 21 provided on the metal sheet 2.

The chuck members 47 move carried along by the endless conveyor element 44 as it moves forward. The guide rollers 81 roll and move within a guide element 87 having a squared "U" shaped cross section, thereby maintaining a stable attitude during travel even when the edges of the metal sheet 2 are gripped. Above the track for the chuck members 47 are disposed cams 88, located at a point at which a chuck members 47 are to grip the sides of the metal sheet 2 and the point at which the grip on the metal sheet is to be released, for engaging the cam follower 79 in order to open or shut the moveable chucking element 78 with respect to the stationary chucking element 73; between the two cams 88 is disposed an opening-prevention guide plate 89, or cam, consisting of a plate material of prescribed thickness. The opening-prevention guide plate 89 is in sliding contact with the bottom of the cam follower 79 to prevent the moveable element 74 from turning, thereby preventing the moveable chucking element 78 from moving away from the stationary chucking element 73.

FIG. 8 is a lateral cross section of the center drive mechanism 43 of the expanding machine 40. The center drive mechanism 43 is equipped with a center guide member 91 that comprises a conveyor chain 54 (described earlier with reference to FIG. 1) and a plurality of guide elements 90 secured to the outside of the conveyor chain 54.

The guide members 90 are provided with insertable catching elements 92 projected from beneath into the engagement protrusion 22 of the metal sheet 2. Above the center guide member 91 is disposed a presser plate 93 that pushes the central portion of the metal plate 2 against the center guide member 91.

Figure 9A:
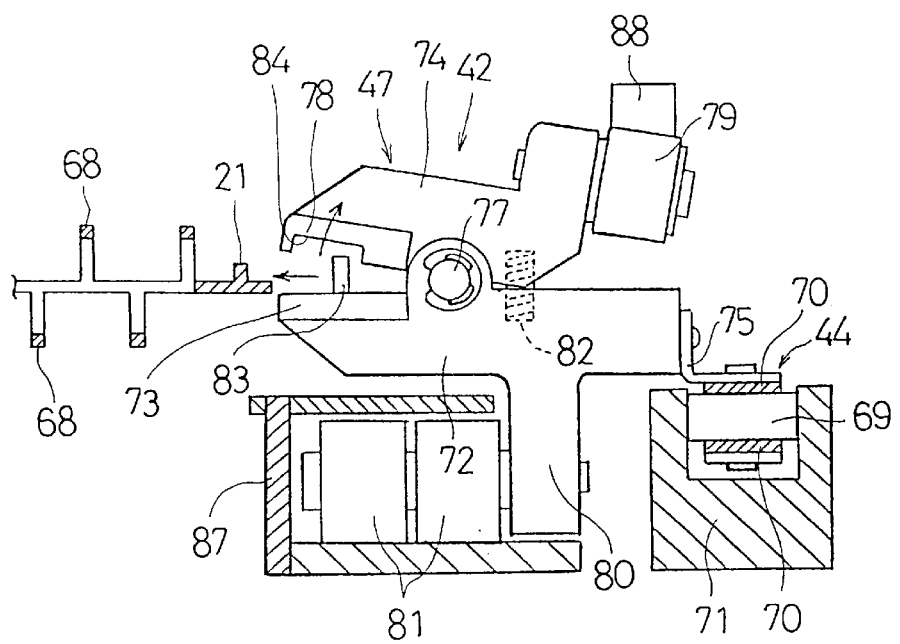
FIG. 9A and 9B illustrate the operation of a side drive mechanism in the expanding machine, 9A being a broken front view of the mechanism just prior to gripping the metal sheet and 9B being a broken front view of the mechanism gripping the metal sheet.

The operation of an expanding machine 40 having the constitution described above will now be discussed with reference to FIG. 9. The chuck members 47 are transported along by the motion of the endless conveyor elements 44; at a location shortly before an individual chuck member comes into contact with the emerging metal sheet 2, which has been provided with slits 67 and areas of curved distention 68 by the reticulating machine 39, the cam follower 79 thereof becomes engaged by the cam 88 causing the moveable chucking element 78 to move, through the agency of the moveable element 74, in the release direction (indicated by an arrow) away from the stationary chucking element 73 in the manner depicted in FIG. 9A. The chuck member 47, held with the chucking elements 73 and 78 thereof in the open state through rolling of the cam follower 79 along the cam 88, is transported into proximity with the metal sheet 2, whereupon the edge of the metal sheet 2 enters the gap between the open chucking elements 73 and 78.

Figure 9B:
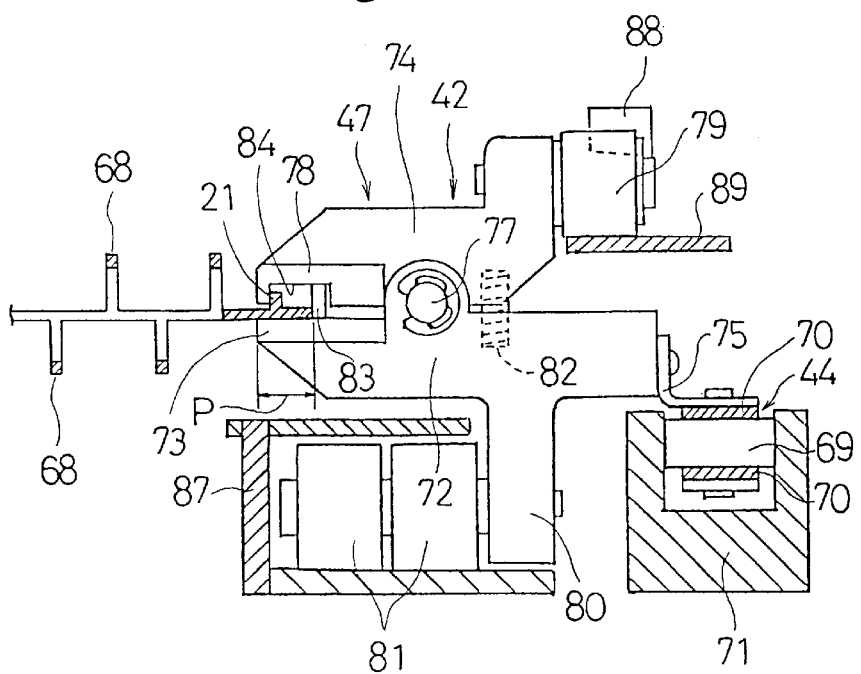

The metal sheet 2 entering the gap between the two chucking elements 73 and 78 is halted at the point at which it comes into contact with the positioning protrusion 83 on the stationary chucking element 73, thereby positioning it with respect to the chucking member 47. Referring now to FIG. 9B, immediately after the cam follower 79 is released from the cam 88, the moveable element 74 turns in the counterclockwise direction in the drawing due to the spring force provided by the compression spring 82 so that the moveable chucking element 78 comes into contact with the metal sheet 2. At this point, the engagement projection 21 of the metal sheet 2 enters the engagement recess 84 of the moveable chucking element 78 and becomes caught therein. In contrast to the unstable engagement provided by interposition between two chain members 19 located above and below the sheet, as in the prior art, this arrangement affords secure grip by the chuck members 47. The subsequent sliding contact of the bottom of the cam follower 79 against the opening-prevention plate 89 prevents the moveable chucking element 78 from moving in the open direction, thereby making it impossible for the sheet to come out as it is expanded in the lateral direction by the chuck members 47.

In the chuck members 47, only the chucking elements 73 and 78 which directly grip the metal sheet 2 are fabricated from hard, high-strength metal, thereby affording a design that is both inexpensive and durable. Breakage due to pulling force during expansion of the metal sheet 2 is virtually eliminated, thereby avoiding a drop in productivity entailed by frequent replacement of components.

Referring again to FIG. 9B, the grip margin, p, of the metal sheet 2 by the chuck member 47 is regulated by the positioning protrusion 83, and accordingly when the moveable chucking element 78 is moved towards the closed position with respect to the stationary chucking element 73, the engagement projections 21 of the metal sheet 2 are placed in contact with the inside face of the engagement recess 84 of the movable chucking element 78, with no gap present therebetween. The metal sheet 2 is thereby gripped securely by the chuck member 47 without chattering. The gripping force exerted on the metal sheet 2 by the two chucking elements 73 and 78 can be adjusted freely through modification of the thickness of the opening-prevention guide plate 89 with reference to the position or thickness of the metal sheet 2. Accordingly, it is possible to prevent damage to or wrinkling of the metal sheet 2 due to excessive pinching force of the metal sheet 2 by the chuck member 47. The grip margin p, which is removed once the metal sheet 2 has been transformed into an expanded metal sheet, is significantly narrower than the area P (see FIG. 14A) which is customarily cut away in the prior art, and this has the advantage of significantly reducing material loss.

During the process of expanding the metal sheet 2 in the lateral direction, the two side drive mechanisms 42 convey the metal sheet 2 while pulling the two edges thereof outward within the same horizontal plane; in contrast, the center drive mechanism 43 conveys the metal sheet 2 while deflecting it upward. The center guide member 91 of the center drive mechanism 43 has an angle of upward slope established such that the distance over which the metal sheet 2 is conveyed in the forward direction F per unit of time is substantially equal to the distance over which it is conveyed outward by the side drive mechanisms 42. Slight discrepancies in the travel distance produced by the center drive mechanism 43 and the side drive mechanisms 42 can be eliminated through fine tuning the center drive mechanism 43 speed produced by the motor 57 so as to be slightly faster than the side drive mechanism 42 speed produced by the motor 50.

In this way, the metal sheet 2 is conveyed at the same speed over its entire lateral extension so that L0=L1=L2, as indicated by the solid lines in FIG. 15. Thus, expansion is uniform throughout and no wrinkles are produced in the central portion. The result is the core material 29 depicted in FIG. 10, exhibiting uniform cell 31 size and being free from mispositioning of the nodes 33.

In contrast, expansion within the same plane, as practiced in the prior art, results in the occurrence of wrinkles in the central portion due to discrepancies in travel distance between the central portion and the lateral edges, as indicated by the alternate long and two short dashes lines in FIG. 15.

As disclosed earlier, the two chucking elements 73 and 78 of the chuck members 47 of the side drive mechanisms 42 are the only elements that are fabricated from hard, strong metal in order to provide durability. Since the metal sheet 2 is moreover conveyed at the same speed over its entire lateral extension, these elements are subjected exclusively to pulling force in the lateral direction, thereby ensuring extended life.

In the embodiment disclosed above, the center drive mechanism 43 is provided with the center guide member 91 deflected upward to produce an upward slope; however, the same effect may be achieved by deflecting the center guide member 91 downward to produce a downward slope. Even where the center guide member 91 is disposed in the same plane as the side drive mechanisms 42 without being deflected in the direction of thickness of the metal sheet 2, the same effect may be achieved by setting the center drive mechanism 43 speed to a level sufficiently faster than that of the side drive mechanisms 42. The manufacturing apparatus disclosed herein is not limited to the production of lead storage battery plates 38, and can be employed in the manufacture of other expanded mesh sheets, such as lath mesh.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An apparatus for expanding a metal sheet, comprising:
a reticulating machine for producing a plurality of slits in said metal sheet, said plurality of slits being disposed in a continuous and zig zag arrangement extending in a lengthwise direction of the metal sheet and absent at lateral edge portions of said metal sheet, and for simultaneously producing engagement projections in the lateral edge portions of the metal sheet; and
an expanding machine for receiving the metal sheet from the reticulating machine at a receiving position and expanding the metal sheet in a lateral direction thereof to open said slits and thereby produce a lozenge-shaped mesh configuration, said expanding machine including:
  side conveyor elements disposed at positions respectively proximate said lateral sides of said metal sheet at said receiving position and diverging from one another outward about a central transfer direction, said side conveyor elements defining a side conveyor plane;
  cam members extending along said side conveyor elements;
  a side drive mechanism for driving said side conveyor elements to move away from the receiving position; and
  chuck member assemblies provided on each of said side conveyor elements for serially gripping said engagement projections of the lateral edge portions of said metal sheet in order to expand said metal sheet as it is conveyed outward from said receiving position by said conveyor elements, and for releasing said metal sheet once expansion is completed, said chuck member assemblies each including:
    chuck jaws moveable relative one another between an open position and a closed position whereat said chuck jaws grasp the metal sheet;
    a spring biasing said chuck jaws to the closed position; and
    a cam follower extending from one of said chuck jaws so as to be engageable with a respective one of said cams to open said chuck jaws against force of the spring.

2. An apparatus for expanding a metal sheet, comprising:
a reticulating machine for producing a plurality of slits in said metal sheet, said plurality of slits being disposed in a continuous and zig zag arrangement extending in a lengthwise direction of the metal sheet and absent at lateral edge portions of said metal sheet, and for simultaneously producing engagement projections in the lateral edge portions of the metal sheet; and
an expanding machine for receiving the metal sheet from the reticulating machine at a receiving position and expanding the metal sheet in a lateral direction thereof to open said slits and thereby produce a lozenge-shaped mesh configuration, said expanding machine including:
  side conveyor elements disposed at positions respectively proximate said lateral sides of said metal sheet at said receiving position and diverging from one another outward about a central transfer direction, said side conveyor elements defining a side conveyor plane;
  cams extending along each of said side conveyor elements;
  a side drive mechanism for driving said side conveyor elements to move away from the receiving position; and
  chuck member assemblies provided on each of said side conveyor elements for serially gripping said engagement projections of the lateral edge portions of said metal sheet in order to expand said metal sheet as it is conveyed outward from said receiving position by said conveyor elements, and for releasing said metal sheet once expansion is completed; said chuck member assemblies each including:
    a frame element secured to a respective one of said side conveyor elements;
    a stationary chucking element extending from said frame element;
    a moveable chucking element mounted pivotably with respect to said stationary chucking element for opening and closing a spacing between the moveable chucking element and the stationary chucking element to grasp the metal sheet therebetween;
    a spring for biasing said moveable chucking element into said stationary chucking elements to a grasping position whereat said metal sheet is grasped; and
    a cam follower extending from the moveable chucking element for engaging a respective one of said cams extending along said side conveyor elements to pivot said moveable chucking element with respect to said stationary chucking element; and
  said cams extending along said side conveyor elements being disposed to overcome forces of the springs to open said moveable chucking elements and said stationary chucking elements from the grasping position.

3. An apparatus for expanding a metal sheet, comprising:
a reticulating machine for producing a plurality of slits in said metal sheet, said plurality of slits being disposed in a continuous and zig zag arrangement extending in a lengthwise direction of the metal sheet and absent at lateral edge portions of said metal sheet, and for simultaneously producing engagement projections in the lateral edge portions of the metal sheet; and
an expanding machine for receiving the metal sheet from the reticulating machine at a receiving position and expanding the metal sheet in a lateral direction thereof to open said slits and thereby produce a lozenge-shaped mesh configuration, said expanding machine including:
  side conveyor elements disposed at positions respectively proximate said lateral sides of said metal sheet at said receiving position and diverging from one another outward about a central transfer direction, said side conveyor elements defining a side conveyor plane;
  a side drive mechanism for driving said side conveyor elements to move away from the receiving position;
  cam members extending along each of said side conveyor elements; and
  chuck member assemblies disposed on each of said side conveyor elements for serially gripping said engagement projections of the lateral edge portions of said metal sheet in order to expand said metal sheet as it is conveyed outward from said receiving position by said conveyor elements, and for releasing said metal sheet once expansion is completed, said chuck member assemblies each including:
    a frame element secured to a respective one of said side conveyor elements;
    a stationary chucking element extending from said frame element;
    a moveable chucking element mounted pivotably with respect to said stationary chucking element for opening and closing a spacing between the moveable chucking element and the stationary chucking element to grasp the metal sheet therebetween;

a cam follower extending from the moveable chucking element for engaging a respective one of said cams extending along said side conveyor elements to pivot said moveable chucking element with respect to said stationary chucking element;

said stationary chucking element having a positioning protrusion for contacting a lateral edge of the metal sheet to effect positioning in a lateral direction of said metal sheet; and said moveable chucking element having an engagement recess for receiving and holding the engagement projections of said metal sheet.

4. An apparatus for expanding a metal sheet, comprising:

a reticulating machine for producing a plurality of slits in said metal sheet, said plurality of slits being disposed in a continuous and zig zag arrangement extending in a lengthwise direction of the metal sheet and absent at lateral edge portions of said metal sheet, and for simultaneously producing engagement projections in the lateral edge portions of the metal sheet; and an expanding machine for receiving the metal sheet from the reticulating machine at a receiving position and expanding the metal sheet in a lateral direction thereof to open said slits and thereby produce a lozenge-shaped mesh configuration, said expanding machine including:

side conveyor elements disposed at positions respectively proximate said lateral sides of said metal sheet at said receiving position and diverging from one another outward about a central transfer direction, said side conveyor elements defining a side conveyor plane;

a side drive mechanism for driving said side conveyor elements to move away from the receiving position;

cams extending along each of said side conveyor elements; and chuck member assemblies disposed on each of said side conveyor elements for serially gripping said engagement projections of the lateral edge portions of said metal sheet in order to expand said metal sheet as it is conveyed outward from said receiving position by said conveyor elements, and for releasing said metal sheet once expansion is completed, said chuck member assemblies each including:

a frame element secured to a respective one of said side conveyor elements;

a stationary chucking element extending from said frame element;

a moveable chucking element mounted pivotably with respect to said stationary chucking element for opening and closing a spacing between the moveable chucking element and the stationary chucking element to grasp the metal sheet therebetween; and a cam follower extending from the moveable chucking element for engaging a respective one of said cams extending along said side conveyor elements to pivot said moveable chucking element with respect to said stationary chucking element;

opening-prevention guide plates extending along each of said side conveyor elements for engaging said cam followers at a location opposite engagement by the cam, to prevent the moveable chucking elements from moving in a release direction away from the stationary chucking elements; and said opening-prevention guide plates being disposed to bias said moveable chucking elements toward said stationary chucking elements to exert sufficient force on the metal sheet to effect expansion thereof.

5. The apparatus of claim 4 wherein said chuck member assemblies each include a spring for biasing said moveable chucking element and said stationary chucking element into a grasping position, the spring being overcome by said cams extending along said side conveyor elements to open said moveable chucking element and said stationary chucking element from the grasping position.

6. An apparatus for expanding a metal sheet, comprising:

a reticulating machine for producing a plurality of slits in said metal sheet, said plurality of slits being disposed in a continuous and zig zag arrangement extending in a lengthwise direction of the metal sheet and absent at a central portion and lateral edge portions of said metal sheet, and for simultaneously producing an engagement protrusion in the central portion of the metal sheet and engagement projections in the lateral edge portions the metal sheet;

an expanding machine for receiving said metal sheet from the reticulating machine at a receiving position, said expanding machine including;

side conveyor elements for engaging said lateral edge portions of said metal sheet and pulling said lateral edge portions respectively outward away from one another while conveying said metal sheet in a forward direction away from the receiving position to effect expansion thereof and thereby produce a lozenge-shaped mesh configuration in said metal sheet;

a side drive mechanism for driving said side conveyor elements;

a center guide device for conveying said central portion of said metal sheet along an inclination diverging from a plane defined by said side conveyor elements thereby bending the metal sheet along said central portion; and said center guide device including first and second guide members biased towards one another and disposed to press said central portion therebetween, and at least one of said first and second guide members being configured to engage a profile of said engagement protrusion to stabilize lateral positioning of said sheet metal.

7. An apparatus for expanding a metal sheet, comprising:

a reticulating machine for producing a plurality of slits in said metal sheet, said plurality of slits being disposed in a continuous and zig zag arrangement extending in a lengthwise direction of the metal sheet and absent at a central portion and lateral edge portions of said metal sheet, and for simultaneously producing an engagement protrusion in the central portion of the metal sheet and engagement projections in the lateral edge portions of the metal sheet; and an expanding machine for receiving the metal sheet from the reticulating machine at a receiving position and expanding the metal sheet in a lateral direction thereof to open said slits and thereby produce a lozenge-shaped mesh configuration, said expanding machine including:

side conveyor elements disposed at positions respectively proximate said lateral sides of said metal sheet at said receiving position and diverging from one another outward about a central transfer direction, said side conveyor elements defining a side conveyor plane;

a side drive mechanism for driving said side conveyor elements to move away from the receiving position;

chuck member assemblies provided on each of said side conveyor elements for serially gripping said engagement projections of the lateral edge portions of said metal sheet in order to expand said metal sheet as it is conveyed outward from said receiving position by said conveyor elements, and for releasing said metal sheet once expansion is completed;

a center guide device for conveying said central portion of said metal sheet along an inclination diverging from said side conveyor plane defined by said side conveyor elements thereby bending the metal sheet along said central portion; and said center guide device including first and second guide members biased towards one another and disposed to press said central portion therebetween, and at least one of said first and second guide members being configured to engage a profile of said engagement protrusion to stabilize lateral positioning of said sheet metal.

8. The apparatus as defined in claim 6 or 7, further comprising:

a center drive mechanism for driving one of said first and second guide members to convey the central portion of the metal sheet in a direction away from the receiving position; and said center drive mechanism and said side drive mechanism being driven by separate drive devices, and the center drive mechanism being driven at a faster rate of speed than the side drive.

9. The apparatus of claim 7 wherein:

cam members extending along each of said side conveyor elements; and said chuck member assemblies each include:
   a frame element secured to a respective one of said side conveyor elements;
   a stationary chucking element extending from said frame element;
   a moveable chucking element mounted pivotably with respect to said stationary chucking element for opening and closing a spacing between the moveable chucking element and the stationary chucking element to grasp the metal sheet therebetween; and
   a spring for biasing said moveable chucking elements and said stationary chucking elements into a grasping position, the spring being overcome by said cams extending along said side conveyor elements to open said moveable chucking elements and said stationary chucking elements from the grasping position.

* * * * *